Jan. 27, 1953　　　C. P. DUFFY　　　2,626,622
DISHWASHING APPARATUS
Filed Feb. 11, 1947　　　　　　　　　7 Sheets-Sheet 1

Inventor
Cyrus P. Duffy

By *Clarence A. O'Brien and Harvey B. Jacobson*
Attorneys

Jan. 27, 1953 — C. P. DUFFY — 2,626,622
DISHWASHING APPARATUS
Filed Feb. 11, 1947 — 7 Sheets-Sheet 2

Inventor
Cyrus P. Duffy

By Clarence A. O'Brien
and Harvey B. Jacobson
Attorneys

Jan. 27, 1953  C. P. DUFFY  2,626,622
DISHWASHING APPARATUS
Filed Feb. 11, 1947  7 Sheets-Sheet 4

Inventor
Cyrus P. Duffy

By *Clarence A. O'Brien
and Harvey B. Jacobson*
Attorneys

Jan. 27, 1953 — C. P. DUFFY — 2,626,622
DISHWASHING APPARATUS
Filed Feb. 11, 1947 — 7 Sheets-Sheet 5

Inventor
Cyrus P. Duffy

By Clarence A. O'Brien
and Harvey B. Jacobson
Attorneys

Jan. 27, 1953     C. P. DUFFY     2,626,622
DISHWASHING APPARATUS

Filed Feb. 11, 1947     7 Sheets-Sheet 6

Inventor
Cyrus P. Duffy

By Clarence A. O'Brien
and Harvey B. Jacobson
Attorneys

Jan. 27, 1953   C. P. DUFFY   2,626,622
DISHWASHING APPARATUS
Filed Feb. 11, 1947   7 Sheets-Sheet 7
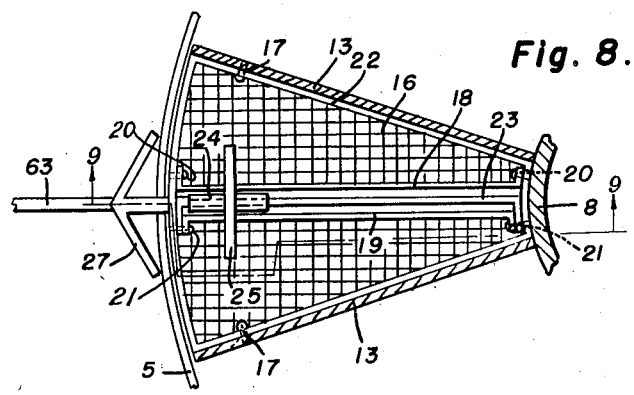
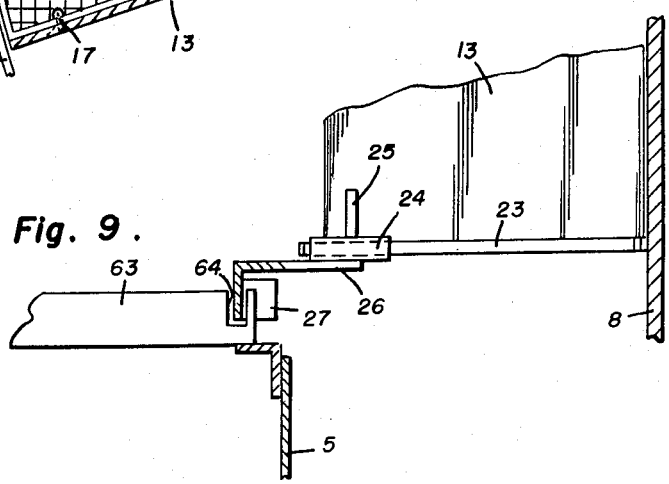
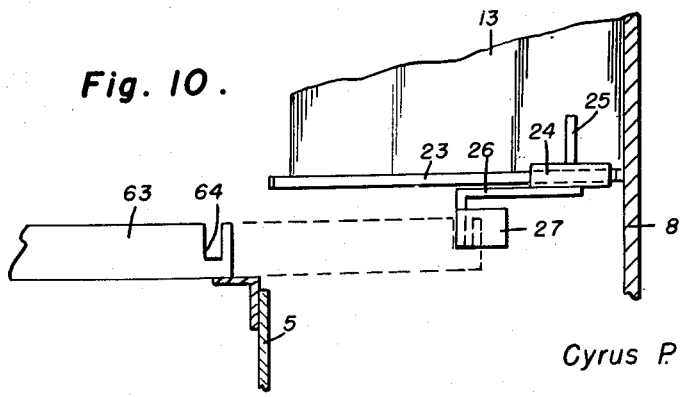
Inventor
Cyrus P. Duffy
By Clarence A. O'Brien
and Harvey B. Jacobson
Attorneys Patented Jan. 27, 1953

2,626,622

UNITED STATES PATENT OFFICE 2,626,622

DISHWASHING APPARATUS

Cyrus P. Duffy, Brooklyn, N. Y.

Application February 11, 1947, Serial No. 727,837

5 Claims. (Cl. 134—80)

This invention relates to improvements in dish washing apparatus.

An object of the invention is to provide an improved motor operated dish washing apparatus including a rotatable drum having a plurality of radially extending vertical partitions attached thereto with horizontal wedge-shaped dish supporting screens attached to adjacent partitions, and means for first spraying a cleansing bath of soap and water on the dirty dishes when placed on the screens and thereafter a rinsing bath of hot water.

Another object of the invention is to provide an improved dish washing apparatus including a fixed washing housing in which a drum is rotatably mounted, being provided with a plurality of radially extending partitions attached thereto with horizontal wedge-shaped dish supporting screens attached to adjacent partitions, together with motor operated driving means for said drum and for a pair of pumps which first spray a bath of soap and water over the dirty dishes when placed on the screens and thereafter a rinsing bath of hot water, the soap and water and rinsing water being returned to storage tanks provided therefor to be used until it has to be renewed.

A still further object of the invention is to provide an improved dish washing apparatus which will be highly efficient in operation and relatively inexpensive to manufacture and produce.

Other objects will appear as the description proceeds.

In the accompanying drawings which form a part of this application,

Figure 8 is a plan view of one of the dish supporting screens showing the dish ejecting mechanism;

Figure 9 is a view taken on the line 9—9 of Figure 8 showing the dish ejecting rack in its outermost or ejecting position, and Figure 10 is a similar view of Figure 9, but showing the dish ejecting rack in its innermost or retracted position.

Like characters of reference are used throughout the following specification and the accompanying drawings to designate corresponding parts.

In carrying out the invention, there is provided a substantially circular flat base 1 which is supported upon the plurality of rounded semicircular feet 2.

A plurality of vertical angle iron standards 3 are secured to the angle brackets 4, which in turn are secured to the upper surface of said circular flat base 1 in spaced relation about the periphery thereof.

Figure 5:
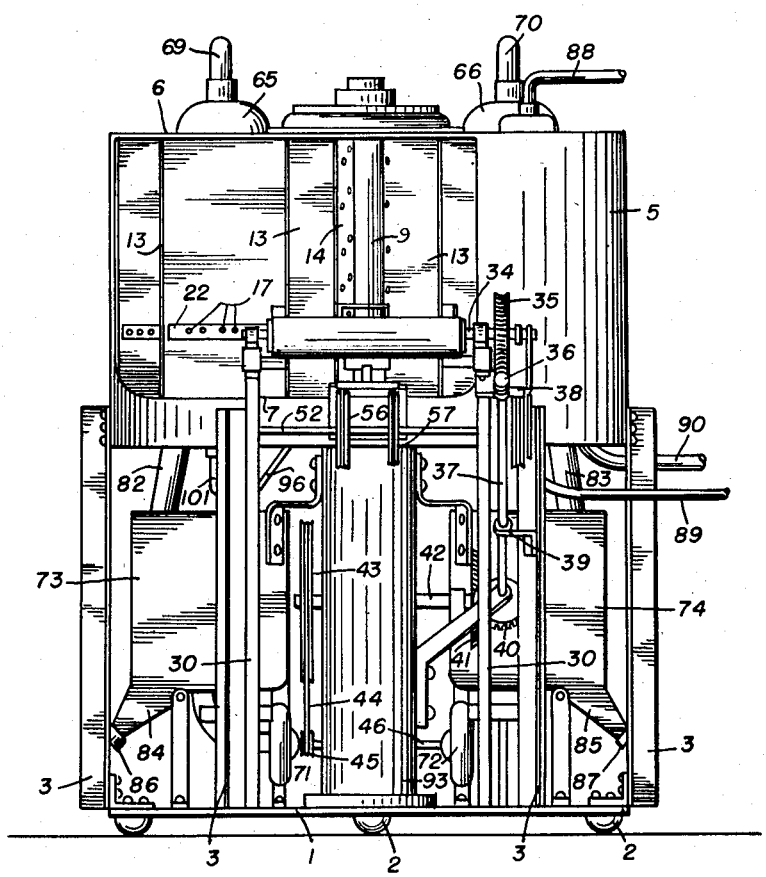
Figure 5 is a vertical sectional view through the improved dish washing apparatus.
Figure 6:
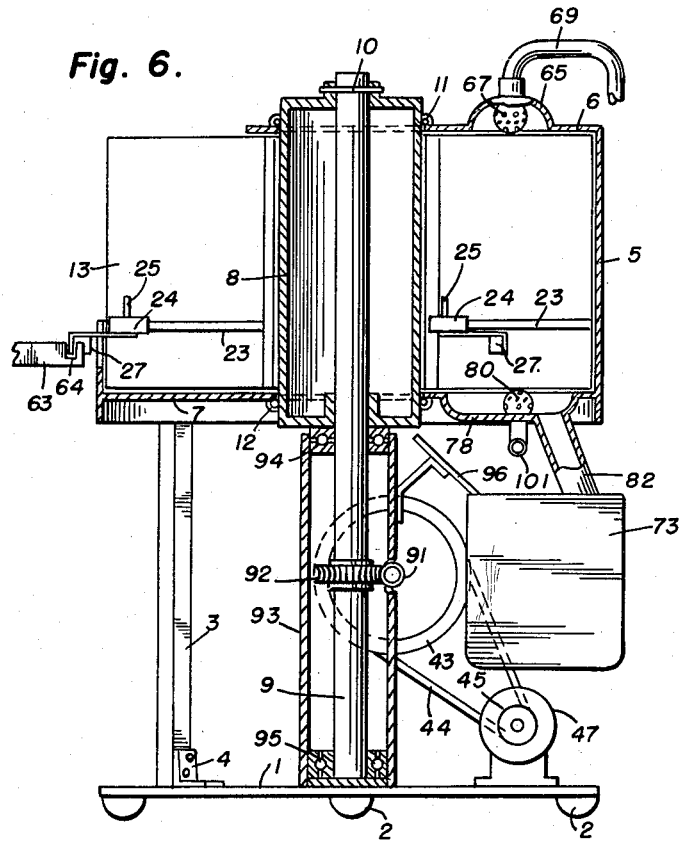
Figure 6 is a vertical sectional view through the improved dish washing apparatus taken at right angles to the showing in Figure 5.

The cylindrical washing tank or housing 5 is supported at the upper ends of the vertical angle iron standards 3, and is provided with a top 6, Figures 5 and 6, and bottom 7, and is formed with vertically aligned central openings in which the hollow drum 8 is mounted for rotation upon the vertical central drive shaft 9.

The drum 8 is secured by the key 10 at its upper end to the shaft 9 and extends a slight distance above and below the washing tank or housing 5, being provided with the upper and lower annularly disposed packings 11 and 12 respectively.

Figure 1:
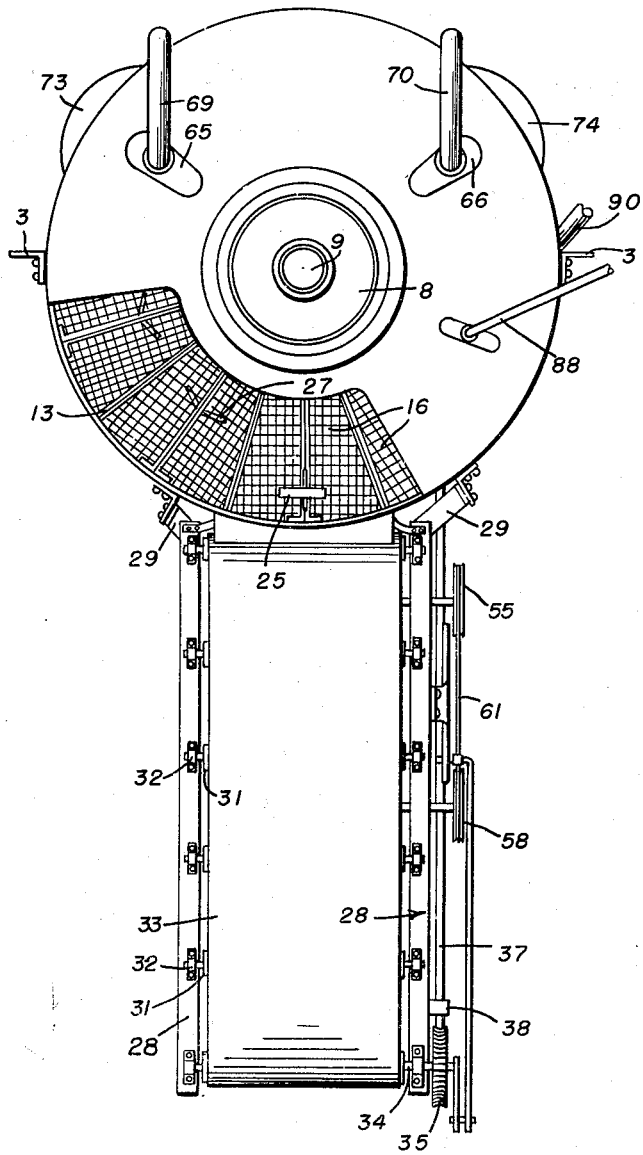
Figure 1 is a plan view of the improved dish washing apparatus.

About one third of the top 6 is uncovered to permit dishes to be placed in the washing tank or housing 5 and a portion of the housing 5 is cut away as shown in Figures 1 and 6 to remove the cleansed dishes.

A plurality of equally spaced vertically extending partitions 13, Figures 1, 2, 6 and 8, are disposed radially in the tank or housing 5, being attached to the outer peripheral wall of the drum 8 by means of the angle brackets 14, and extend to points adjacent the inner surfaces of the tank or housing side wall 5 and the top 6 and bottom 7 thereof.

Substantially triangular dish supporting screens 16 are disposed transversely between adjacent partitions 13, being attached thereto by means of the fasteners or rivets 17.

Oppositely disposed U-shaped guide members 18 and 19 as shown in Figure 8, are secured by means of the rivets 20 and 21 to the screen frames 22, and a centrally disposed guide rail 23, substantially square in cross section is disposed between adjacent guide members 18 and 19, and as shown in Figures 6, 9 and 10, supports the square tubular member 24 upon which the upwardly extending dish ejecting plate 25 is formed.

A forwardly extending arm 26 is secured to the lower wall of the tubular member 24 and supports a downwardly extending V-shaped operating plate 27.

Figure 3:
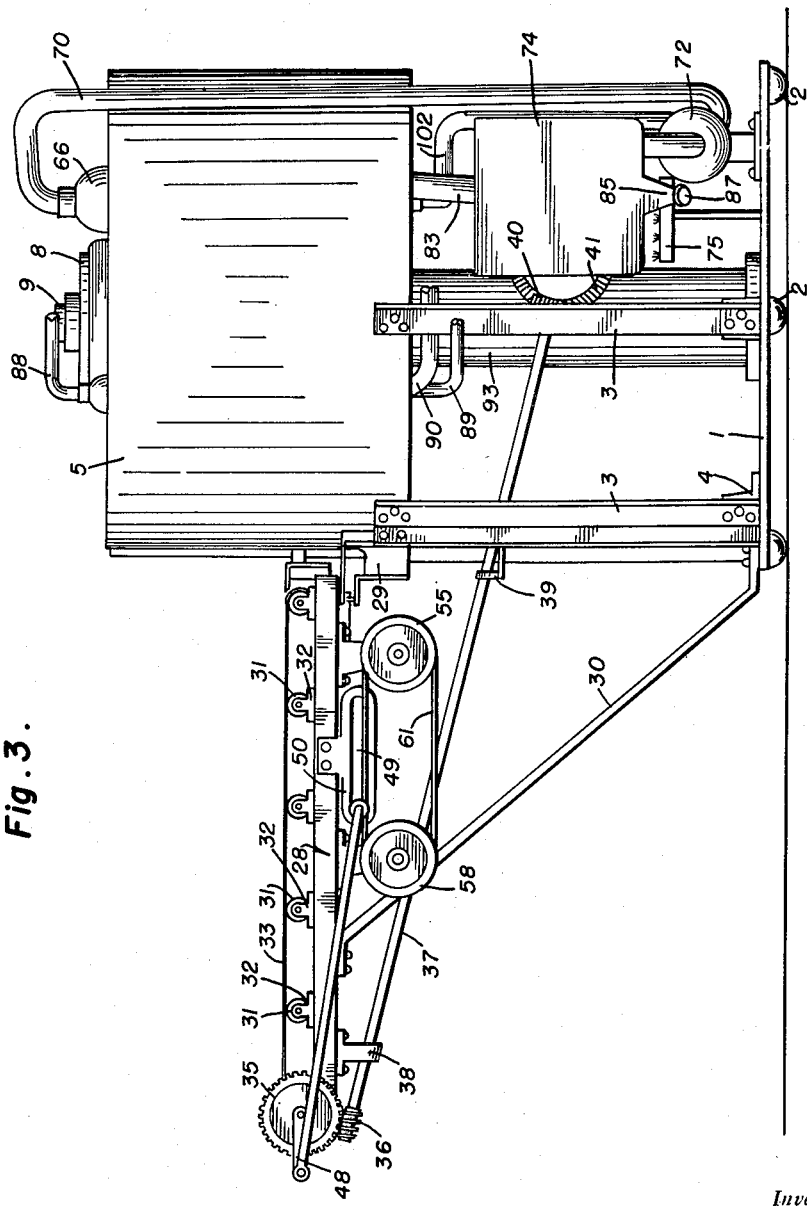
Figure 3 is a side elevation of the improved dish washing apparatus.

The laterally extending conveyor frame 28, see Figure 3, is supported by the brackets 29 to the washing tank or housing 5 and by the spaced outwardly and upwardly extending parallel arms 30 connected to the base 1.

A series of spaced transversely extending rolls 31 are mounted for rotation in the bearings 32 on said frame 28 and support the endless canvas or leather belt 33.

Figure 2:
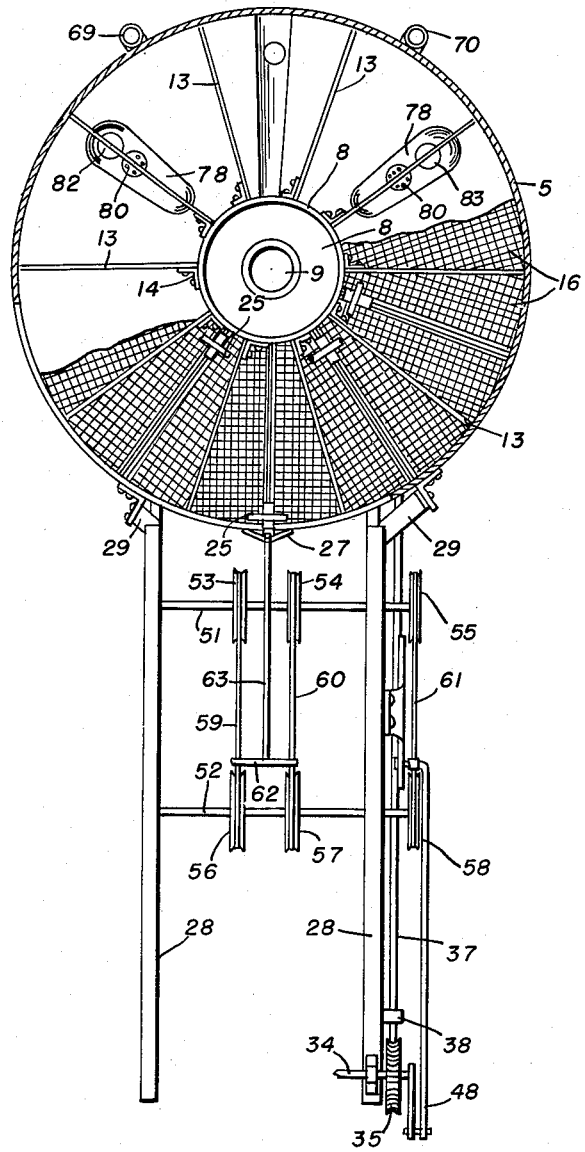
Figure 2 is a partial sectional view taken through the dish washing apparatus with the cover and endless dish conveyor belt removed and certain parts broken away and omitted.
Figure 7:
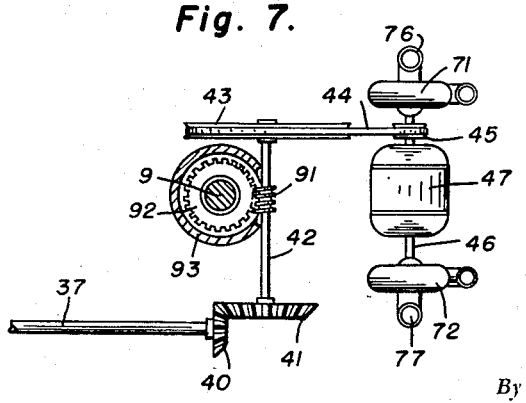
Figure 7 is a plan view of the motor and pump operating assembly.

The outermost roll 31, see Figures 1 and 2, is mounted upon the transverse shaft 34 which is extended laterally of the conveyor frame 28 and supports the gear 35, which meshes with the worm 36, see Figure 3, mounted on the outer end of the shaft 37 extending through the bearings 38 and 39 and supporting a bevel gear 40, see Fig. 7, which meshes with the ring gear 41 mounted on one end of the transversely extending shaft 42 which supports a pulley 43 at its opposite end, the same being driven by the belt 44 from the small pulley 45 on the shaft 46 of the electric motor 47.

A pitman 48, see Fig. 3, is connected with the shaft 34 and extends inwardly towards the tank or housing 5. The inner end of the pitman rod is bent inwardly to extend through the slot 49 in the guide member 50 attached to the conveyor frame 28.

A pair of spaced transversely extending shafts 51 and 52, see Figure 2, are mounted between the arms of the conveyor frame 28, and support the pulleys 53, 54 and 55 and 56, 57 and 58 respectively on the said shafts 51 and 52.

Belts 59, 60 and 61 are connected between the oppositely disposed pulleys, and the inner end of the pitman rod 48 is fastened to the belt 61 to move back and forth as the direction of the pulleys change due to the pitman connection which operates all of the pulleys and the interconnected belts.

A cross arm 62 is secured between the belts 59 and 60 being attached thereto and supports the dish actuating ejecting rod 63, see Figures 8 and 9, which is transversely notched at 64 in its upper and inner edge, providing means for engaging the V-shaped operating plate 27 as the drum 8 is rotated.

The dishes (not shown) are placed upon the screens 16 and after they are washed by the washing apparatus hereinafter described, the dish actuating ejecting rod 63 moves inwardly and outwardly and the end of the operating plate 27 is engaged in the notch 64 to pull the tubular member 24 outwardly on the guide rail 23, thereby pulling the dish ejecting plate 25 outwardly to push the cleaned dishes from the tank or housing onto the endless conveyor belt 33. As the drum 8 rotates, the actuating rod 63 will push the tubular member 24 back on the guide rail 23 to its innermost position and as it moves outwardly, the notch 64 will be engaged by the leading end of the V-shaped operating plate 27 in the next approaching segment of the rotating trays or screens and the same operation is repeated to move the cleaned dishes automatically from the dish washing machine onto the endless conveyor.

It will now be understood from the annexed drawings and from the invention as previously described, that the member 63 having the notch 64 will be reciprocated by the above-mentioned cables 59 and 60 through the connecting pitman 48 and the associated mechanism in timed relation to rotation of the drum 8 and the screens 16 carried thereby, so that as each screen in turn comes into substantial registry with the above-mentioned opening or cutaway portion of the housing which constitutes the discharge opening for the dishes, the rotating V-shaped depending members 27 will have their leading edges adapted to register with and to move into the ends of the notches 64 as the members 27 rotate and the member 63 is substantially stationary.

It is contemplated that the reciprocation of the members 59 and 60 will be properly timed so as to be at the radially inward extremity of their reciprocation just prior to and at the time when the notch 64 is engaged by the leading edge of the bracket member 27, whereby this notch will be substantially stationary or have relatively little movement at the moment of engagement. Continued rotation of the member 8 will then cause the depending member 27 to move across the member 63 through the notch 64 thereof, and during this movement the member 63 will move upon its outward path of reciprocation carrying with it the ejecting plate 25 to thereby displace the cleansed dishes from the screen 16 onto the moving belt 33 which overlies the member 63. During the time when the member 27 is passing through the notch 64, the outward reciprocation to eject the dishes will be completed, and the inward reciprocation to return the ejector plate 25 to its innermost position will also be completed, whereupon the trailing edge of the member 27 will disengage from the notch 64. This cycle will be repeated successively for each of the screens with their ejecting means.

A pair of spaced upwardly extending blisters 65 and 66 are formed in the top 6 of the washing tank or housing 5 and support the perforated spray heads 67 connected by means of the pipes 69 and 70 with discharge outlets of the two pumps 71 and 72, see Figure 7, connected to and driven by the electric motor 47 through its shaft 46.

Storage tanks 73 and 74 are supported below the tank or housing 5 by the brackets 100 and receive soap and water and hot water respectively, a gas burner 75, see Fig. 3, being disposed beneath the tank 74 for heating the hot water. The pipes 76 and 77 connect the tanks 73 and 74 with the inlet connections for the pumps 71 and 72.

Figure 4:
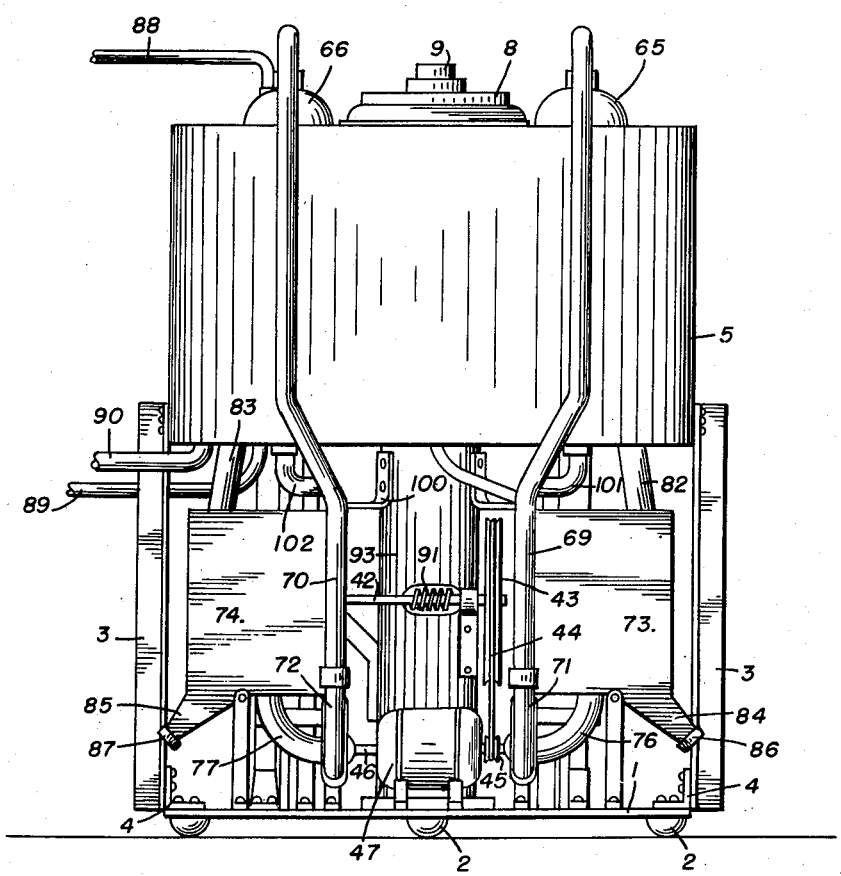
Figure 4 is a rear elevation of the improved dish washing apparatus.

The blisters or sumps 78, see Fig. 6, are disposed in the bottom 7 of the washing tank or housing 5 below the blisters 65 and 66 in the top of the tank and support the perforated spray nozzles 80 connected by means of the pipes 101 and 102, see Fig. 4, with the pipes 69 and 70, whereby sprays of soap and water and hot water may be sprayed simultaneously from above and below the dish screens to thoroughly clean the dirty dishes when placed on the screens 16.

Drain pipes 82 and 83 connect the sumps 78 with the tanks 73 and 74 to return the water to the tanks for being repeatedly used.

Depending outlet spouts 84 and 85 are formed on the bottoms of the tanks 73 and 74 for draining the water therefrom when it is to be replaced with clean water. Screw caps 86 and 87 are secured on the spouts 84 and 85 to be removed when the tanks are to be drained.

A hot or cold fresh water supply pipe 88 is connected with the tank 5 and discharges water downwardly through the top 6 of the tank 5, and a hot or cold fresh water supply pipe 89 leads to and through the bottom 7 of the tank 5, and a drain pipe 90 leads the water away from the tank.

A worm 91 on the shaft 42 meshes with the gear 92 disposed about the vertical driving shaft 9 for rotating the drum 8 in the tank or housing 5.

The fixed tubular stand pipe 93 is disposed on the base 1 concentrically of the driving shaft 9 and supports the upper and lower ball bearing races 94 and 95 through which the vertical driving shaft 9 rotates.

Drain troughs 96 will be supported below the drum 8 to permit any leaking water from the washing tank 5 to drain back into the tank 73.

In operating this automatic dish washer, the tanks 73 and 74 are filled with a soap and water mixture and with rinsing water, respectively, and the gas burner 75 is lighted for heating the water in the tank 74. The electric motor 47 is then energized and the drum 8 begins to rotate slowly in the washing tank or housing 5, and the endless conveyor belt 33 begins to move. Dirty dishes, not shown, are placed through the opening in the top 6 of the tank 5 upon the screens 16. The pumps 71 and 72 of course begin supplying the soap and water mixture and the rinsing water to their respective spray nozzles as soon as the rotation of the motor 47 begins, in view of the connections of all the moving instrumentalities to this common source of power. As the drum 8 rotates, the dishes upon the successive screens 16 are sprayed from both above and below by the spray nozzles 67 and 80 as the screens sequentially pass through the successive spraying stations for the soap and water mixture and thereafter the rinsing water. After passing through both of the spraying stations, the screens successively register with the opening in the housing 5, and the depending members 27 of the plate ejectors successively engage with the notches 64 of the ejector actuating member 63 whereby the ejector is reciprocated to discharge the dishes from the screen to the end of the rotating conveyor belt 33, the ejector is returned to its original inward position in readiness to receive the next charge of dishes, and the ejecting flange member 27 is moved out of registry with the notch in the ejector actuating member 63.

It will of course be apparent that the liquids discharged by the spraying heads will be collected in the sumps 78 in the bottom of the washer, and returned to their respective tanks.

From the foregoing description, it will be apparent that there has been devised and provided a highly efficient dish washing apparatus which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A dish washer comprising a base, a washer housing carried by said base, a dish-receiving element rotatable in said housing, said element including a drum having radial partitions carried thereby and having a substantially water tight seal with the housing, dish supporting horizontal screens secured between said partitions, dish ejecting means movably mounted between adjacent partitions, said housing having a dish discharge opening with which said screens successively register, spray means for directing sprays of soap mixture and rinsing water into said element at sequential positions during its rotation, collecting means for separately collecting and discharging said soap mixture and rinsing water from said housing, means for rotating said element and means for actuating said ejecting means during the periods when such ejecting means and screens are in alinement with said discharge opening, said ejecting means including an ejecting plate movable radially of said element, an arm on said plate extending through said housing, said actuating means being mounted exterior of said housing and having an operating connection, said connection being intermittently engageable with said arm for actuating the latter.

2. The combination of claim 1 wherein said actuating means includes a reciprocable rod, said arm being radially reciprocable of said element.

3. The combination of claim 1 including radial guides in said element for said arm.

4. The combination of claim 1 including a cam finger on said arm, said connection being slidably and laterally engageable with said finger for actuating said arm.

5. A dish washer comprising a base, a washer housing carried by said base, a dish receiving element rotatable in said housing, said element including a drum having radial partitions carried thereby and having a substantially water tight seal with the housing, dish supporting horizontal screens secured between said partitions, dish ejecting means movably mounted between adjacent partitions, said housing having a dish discharge opening with which said screens successively register, spray means for directing sprays of soap mixture and rinsing water into said element at sequential positions during its rotation, collecting means for separately collecting and discharging said soap mixture and rinsing water from said housing, means for rotating said element and means for actuating said ejecting means during the periods when such ejecting means and screens are in alinement with said discharge opening, said actuating means including a cross head, a rod on said crosshead having an intermittent engagement with said ejector means, and means for reciprocating said crosshead in timed relation to rotation of said element.

CYRUS P. DUFFY.

REFERENCES CITED

The following references are of record in the file of this patent:

UNITED STATES PATENTS

| Number | Name | Date |
| --- | --- | --- |
| 798,186 | Karliss | Aug. 29, 1905 |
| 1,185,329 | Janisch | May 30, 1916 |
| 1,707,159 | Burnham | Mar. 26, 1929 |
| 1,741,329 | Montgomery | Dec. 31, 1929 |
| 2,039,276 | Ayars | May 5, 1936 |
| 2,347,057 | Lakso | Apr. 18, 1944 |
| 2,416,616 | Deutsch | Feb. 25, 1947 |
| 2,558,818 | Campbell | July 3, 1951 |